(12) United States Patent
Beaumont

(10) Patent No.: US 7,447,720 B2
(45) Date of Patent: Nov. 4, 2008

(54) METHOD FOR FINDING GLOBAL EXTREMA OF A SET OF BYTES DISTRIBUTED ACROSS AN ARRAY OF PARALLEL PROCESSING ELEMENTS

(75) Inventor: Mark Beaumont, Reading (GB)

(73) Assignee: Micron Technology, Inc., Boise, ID (US)

( * ) Notice: Subject to any disclaimer, the term of this patent is extended or adjusted under 35 U.S.C. 154(b) by 698 days.

(21) Appl. No.: 10/689,256

(22) Filed: Oct. 20, 2003

(65) Prior Publication Data

US 2004/0215677 A1  Oct. 28, 2004

(30) Foreign Application Priority Data

Apr. 23, 2003 (GB) ................... 0309206.1

(51) Int. Cl.
*G06F 7/00* (2006.01)
(52) U.S. Cl. ...................................... 708/207
(58) Field of Classification Search ............. None
See application file for complete search history.

(56) References Cited

U.S. PATENT DOCUMENTS

| | | | |
|---|---|---|---|
| 4,410,960 A * | 10/1983 | Kasuya | 712/300 |
| 5,122,979 A | 6/1992 | Culverhouse | |
| 5,241,677 A | 8/1993 | Naganuma et al. | |
| 5,262,969 A | 11/1993 | Ishihara | |
| 5,535,387 A | 7/1996 | Matsuoka et al. | |
| 5,581,773 A | 12/1996 | Glover | |
| 5,630,129 A | 5/1997 | Wheat | |
| 5,737,251 A | 4/1998 | Kohno et al. | |
| 5,850,489 A | 12/1998 | Rich | |
| 5,892,517 A | 4/1999 | Rich | |
| 5,966,528 A | 10/1999 | Wilkinson et al. | |

(Continued)

FOREIGN PATENT DOCUMENTS

EP  0404012 A3  12/1990

(Continued)

OTHER PUBLICATIONS

Daehyun Kim, Mainak Chaudhuri, and Mark Heinrich, Leveraging Cache Coherence in Active Memory Systems, Proceedings of the 16th ACM.

(Continued)

*Primary Examiner*—Tan V. Mai
(74) *Attorney, Agent, or Firm*—Jones Day; Edward L. Pencoske

(57) ABSTRACT

A method for finding an extrema for an n-dimensional array having a plurality of processing elements, the method includes determining within each of the processing elements a dimensional extrema for a first dimension of the n-dimensional array, wherein the dimensional extrema is related to one or more local extrema of the processing elements in the first dimension, determining within each of the processing elements a next dimensional extrema for a next dimension of the n-dimensional array, wherein the next dimensional extrema is related to one or more of the first dimensional extrema, and repeating the determining within each of the processing elements a next dimensional extrema for each of the n-dimensions, wherein each of the next dimensional extrema is related to a dimensional extrema from a previously selected dimension.

19 Claims, 7 Drawing Sheets

U.S. PATENT DOCUMENTS

| | | | |
|---|---|---|---|
| 5,991,785 | A | 11/1999 | Alidina et al. |
| 6,029,244 | A | 2/2000 | Oberman et al. |
| 6,078,945 | A | 6/2000 | Hinsley |
| 6,219,776 | B1 | 4/2001 | Pechanek et al. |
| 6,279,088 | B1 | 8/2001 | Elliott et al. |
| 6,292,822 | B1 | 9/2001 | Hardwick |
| 6,404,439 | B1 | 6/2002 | Coulombe et al. |
| 6,421,772 | B1 | 7/2002 | Maeda et al. |
| 6,430,618 | B1 | 8/2002 | Karger et al. |
| 6,948,056 | B1 * | 9/2005 | Roth et al. .................. 712/300 |
| 2002/0116425 | A1 * | 8/2002 | Imai .......................... 708/207 |

FOREIGN PATENT DOCUMENTS

| | | |
|---|---|---|
| JP | 7-064766 A | 3/1993 |
| SU | 1546960 A | 2/1990 |
| WO | WO 1991/019259 A1 | 12/1991 |
| WO | WO 99/19791 | 4/1999 |
| WO | WO 2001/067238 A1 | 11/2001 |

OTHER PUBLICATIONS

Int'l Conference on supercomputing, pp. 2-13, New York City, USA, Jun. 2002.

Mainak Chaudhuri, Daehyun Kim, and Mark Heinrich, Cache Coherence Protocol Design for Active Memory Systems, Proceedings of the 2002.

Int'l Conference on Parallel and Distributed Processing Techniques and Applications, pp. 83-89, Las Vegas, USA, Jun. 2002.

* cited by examiner

US 7,447,720 B2

METHOD FOR FINDING GLOBAL EXTREMA OF A SET OF BYTES DISTRIBUTED ACROSS AN ARRAY OF PARALLEL PROCESSING ELEMENTS

CROSS-REFERENCE TO RELATED APPLICATIONS

The present application is related to U.S. patent application Ser. No. 10/689,335 entitled "Method for Finding Local Extrema of a Set of Values for a Parallel Processing Element" filed 20 Oct. 2003, and U.S. patent application Ser. No. 10/689,449 entitled "Method for Finding Global Extrema of a Set of Shorts Distributed Across an Array of Parallel Processing Elements" filed 20 Oct. 2003.

BACKGROUND OF THE INVENTION

The present invention relates generally to parallel processing and more particularly to determining an extrema (e.g., maximum or minimum) from a set of values distributed across an array of processing element in a parallel processing system.

Conventional central processing units ("CPU's"), such as those found in most personal computers, execute a single program (or instruction stream) and operate on a single stream of data. For example, the CPU fetches its program and data from a random access memory ("RAM"), manipulates the data in accordance with the program instructions, and writes the results back sequentially. There is a single stream of instructions and a single stream of data (note: a single operation may operate on more than one data item, as in X=Y+Z, however, only a single stream of results is produced). Although the CPU may determine the sequence of instructions executed in the program itself, only one operation can be completed at a time. Because conventional CPUs execute a single program (or instruction stream) and operate on a single stream of data, conventional CPUs may be referred to as a single-instruction, single data CPU or an SISD CPU.

The speed of conventional CPUs has dramatically increased in recent years. Additionally, the use of cache memories enables conventional CPUs faster access to the desired instruction and data streams. However because conventional CPUs can complete only one operation at a time, conventional CPUs are not suitable for extremely demanding applications having large data sets (such as moving image processing, high quality speech recognition, and analytical modeling applications, among others).

Improved performance over conventional SISD CPUs may be achieved by building systems which exhibit parallel processing capability. Typically, parallel processing systems use multiple processing units or processing elements to simultaneously perform one or more tasks on one or more data streams. For example in one class of parallel processing system, the results of an operation from a first CPU are passed to a second CPU for additional processing, and from the second CPU to another CPU, and so on. Such a system, commonly known as a "pipeline", is referred to as a multiple-instruction, single-data or MISD system because each CPU receives a different instruction stream while operating on a single data stream. Improved performance may also be obtained by using a system which contains many autonomous processors, each running its own program (even if the program running on the processors is the same code) and producing multiple data streams. Systems in this class are referred to as a multiple-instruction, multiple-data or MIMD system.

Additionally, improved performance may be obtained using a system which has multiple identical processing units each performing the same operations at once on different data streams. The processing units may be under the control of a single sequencer running a single program. Systems in this class are referred to as a single-instruction, multiple data or SIMD system. When the number of processing units in this type of system is very large (e.g., hundreds or thousands), the system may be referred to as a massively parallel SIMD system.

Nearly all computer systems now exhibit some aspect of one or more of these types of parallelism. For example, MMX extensions are SIMD; multiple processors (graphics processors, etc) are MIMD; pipelining (especially in graphics accelerators) is MISD. Furthermore, techniques such as out of order execution and multiple execution units have been used to introduce parallelism within conventional CPUs as well.

Parallel processing is also used in active memory applications. An active memory refers to a memory device having a processing resource distributed throughout the memory structure. The processing resource is most often partitioned into many similar processing elements (PEs) and is typically a highly parallel computer system. By distributing the processing resource throughout the memory system, an active memory is able to exploit the very high data bandwidths available inside a memory system. Another advantage of active memory is that data can be processed "on-chip" without the need to transmit the data across a system bus to the CPU or other system resource. Thus, the work load of the CPU may be reduced to operating system tasks, such as scheduling processes and allocating system resources.

A typical active memory includes a number of interconnected PEs which are capable of simultaneously executing instructions sent from a central sequencer or control unit. The PEs may be connected in a variety of different arrangements depending on the design requirements for the active memory. For example, PEs may be arranged in hypercubes, butterfly networks, one-dimensional strings/loops, and two-dimensional meshes, among others.

A typical PE may contain data, for example a set of values, stored in one or more registers. In some instances, it may be desirable to determine the extrema (e.g., the highest or lowest value) of the set of values on an individual PE. Furthermore, it may be desirable to find the extrema for an entire array of PEs. Conventional methods for finding the extrema, however, often results in a number processing cycles being "lost." A lost cycle may refer to, for example, a cycle in which the PE must wait to complete a calculation because the necessary data has yet to be transferred into or out of the PE.

Thus, there exists a need for a method for determining the extrema of a set of values on an array of parallel processors such that the resources of the parallel processing system are maximized. More specifically, there exists a need for a method for determining the extrema of a set of values on an array of parallel processing elements of an active memory such that the resources of the active memory are maximized.

SUMMARY OF THE INVENTION

One aspect of the present invention relates to a method for finding an extrema for an n-dimensional array having a plurality of processing elements, the method comprises determining within each of the processing elements a dimensional extrema for a first dimension of the n-dimensional array, wherein the dimensional extrema is related to one or more local extrema of the processing elements in the first dimension, determining within each of the processing elements a next dimensional extrema for a next dimension of the n-dimensional array, wherein the next dimensional extrema is related to one or more of the first dimensional extrema, and repeating the determining within each of the processing elements a next dimensional extrema for each of the n-dimensions, wherein each of the next dimensional extrema is related to a dimensional extrema from a previously selected dimension.

Another aspect of the invention relates to a method comprising identifying extrema within a data stream as having one of an odd or an even position, processing the extrema having an odd position to produce an odd extrema, processing the extrema having an even position to produce an even extrema, and determining a dimensional extrema from the odd extrema and the even extrema.

Another aspect of the invention relates to a method for determining a dimensional extrema for an n-dimensional array of processing elements. The method comprises loading odd numbered extrema from a set of the processing elements in a first dimension into a first plurality of registers, loading even numbered extrema from a set of set processing elements into a second plurality of registers, comparing certain of the loaded odd numbered extrema to produce an odd extrema, comparing certain of the loaded even numbered extrema to produce an even extrema and producing a dimensional extrema in response to the odd extrema and the even extrema.

The present invention enables the extrema of a set of values distributed across an array of parallel processors to be determined while maximizing the resources of the parallel processing system. The present invention may be performed using the hardware and software (i.e., the local processing capability) of each PE within the array. Those advantages and benefits, and others, will become apparent from description of the invention below.

BRIEF DESCRIPTION OF THE DRAWINGS

To enable the present invention to be easily understood and readily practiced, the present invention will now be described for purposes of illustration and not limitation, in connection with the following figures wherein.

DETAILED DESCRIPTION OF THE INVENTION

As discussed above, parallel processing systems may be placed within one or more classifications (e.g., MISD, MIMD, SIMD, etc.). For simplicity, the present invention is discussed in the context of a SIMD parallel processing system. More specifically, the present invention is discussed in the context of a SIMD active memory. It should be noted that such discussion is for clarity only and is not intended to the limit the scope of the present invention in any way. The present invention may be used for other types and classifications of parallel processing systems.

Figure 1:
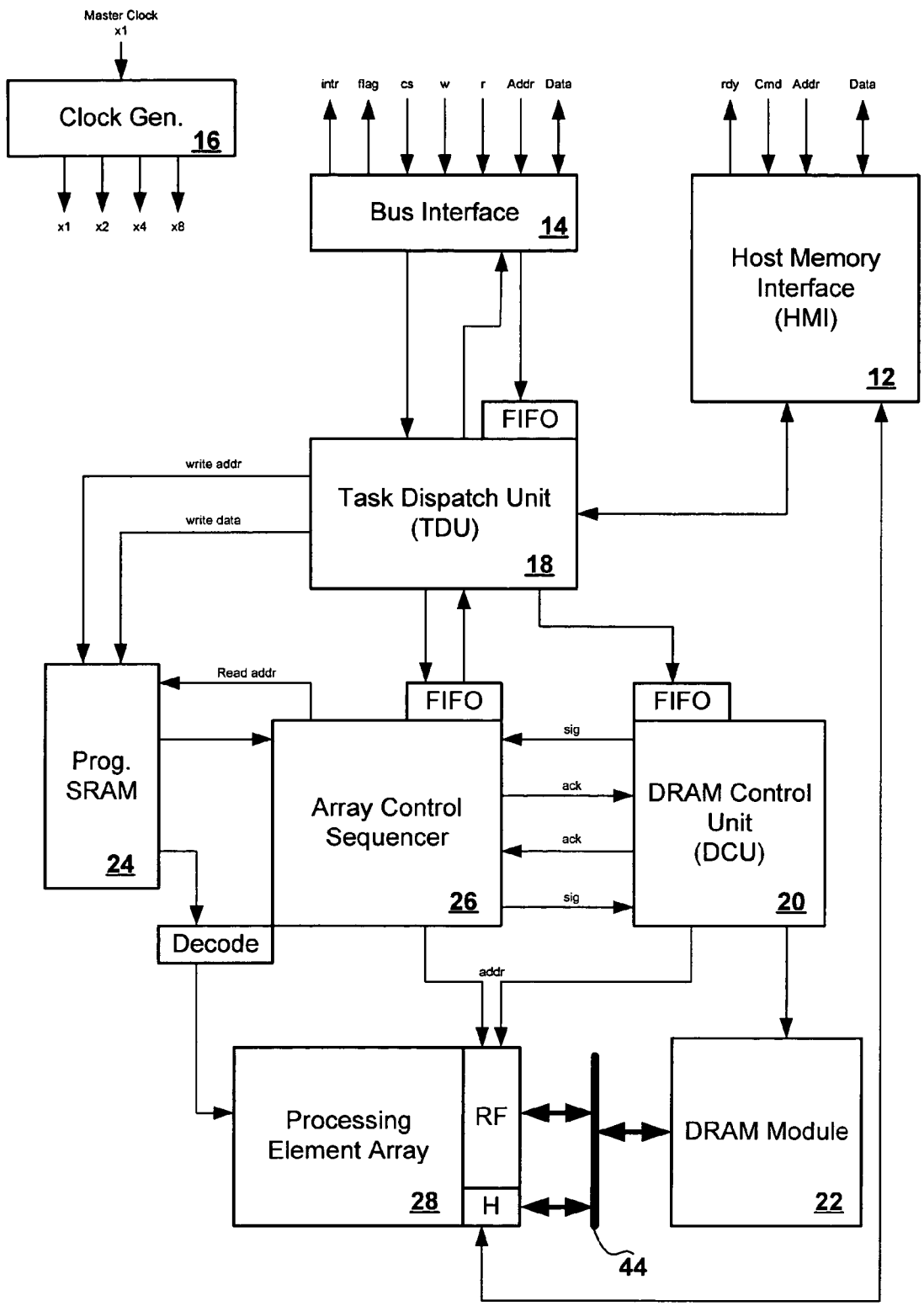
FIG. 1 is a block diagram illustrating an active memory according to an embodiment of the present invention.

FIG. 1 is a block diagram illustrating an active memory 10 according to an embodiment of the present invention. It should be noted that the active memory 10 is only one example of a device on which the methods of the present invention may be practiced and those of ordinary skill in the art will recognize that the block diagram of FIG. 1 is an overview of an active memory device 10 with a number of components known in the art being omitted for purposes of clarity.

Active memory 10 is intended to be one component in a computer system. Processing within active memory 10 is initiated when the active memory 10 receives commands from a host processor (not shown), such as the computer system's CPU. A complete processing operation (i.e., data movement and processing) in the active memory 10 may consist of a sequence of many commands from the host to the active memory device 10.

Active memory 10 is comprised of a host memory interface ("HMI") 12, a bus interface 14, a clock generator 16, a task dispatch unit ("TDU") 18, a DRAM control unit ("DCU") 20, a DRAM module 22, a programmable SRAM 24, an array control sequencer 26, and a processing element array 28, among others.

The HMI 12 provides an input/output channel between the host (such as a CPU, not shown) and the DRAM module 22. In the current embodiment, the HMI 12 receives command (cmd), address (addr), and data signals (among others) from and sends data and ready (rdy) signals (among others) to the host. The HMI 12 approximates the operation of a standard non-active memory so that the host, without modifications, is compatible with the active memory 10.

The HMI 12 may be similar in its operation to the interface of a synchronous DRAM as is know in the art. Accordingly, the host must first activate a page of data to access data within a DRAM module 22. In the current embodiment, each page may contain 1024 bytes of data and there may be 16,384 pages in all. Once a page has been activated, it can be written and read through the HMI 12. The data in the DRAM module 22 may be updated when the page is deactivated. The HMI 12 also sends control signals (among others) to the DCU 20 and to the processing element array 28 via the task dispatch unit 18.

The HMI 12 may operate at a frequency different than that of the frequency of the master clock. For example, a 2×internal clock signal from clock generator 16 may be used. Unlike a traditional DRAM, the access time for the HMI 12 uses a variable number of cycles to complete an internal operation, such as an activate or deactivate. Thus, the ready signal (rdy) is provided to allow the host to detect when a specific command has been completed.

The bus interface 14 provides and input/output channel between the host and the TDU 18. For example, the bus interface 14 receives column select (cs), write command (w), read command (r), address (addr), and data signals (among others) from and places interrupt (intr), flag, and data signals (among others) onto the system bus (not shown). The bus interface 14 also receives signals from and sends signals to TDU 18.

The clock generator 16 is operable to receive an external master clock signal (x1) and operable to provide the master clock signal (x1) and one or more internal clock signals (x2, x4, x8) to the components of the active memory. It should be apparent to one skilled in the art that other internal clock signals may be produced by the clock generator 16.

The TDU 18 communicates with the bus interface 14, the HMI 12, the programmable SRAM 24, the array control sequencer 26, and the DCU 20. In the current embodiment, the TDU 18 functions as an interface to allow the host to issue a sequence of commands to the array control sequencer 26 and the DCU 20. Task commands from the host may be buffered in the TDU's FIFO buffers to allow a burst command to be issued. Commands may contain information on how the tasks in the array control sequencer 26 and the DCU 20 should be synchronized with one another, among others.

The DCU 20 arbitrates between the TDU 18 and the HMI 12 and sends commands to the DRAM modules 22 and the processing element array 28. The DCU 20 also schedules refreshes within the DRAM modules 22. In one embodiment, the DRAM modules 22 of the active memory 10 may be comprised of sixteen 64 k×128 eDRAM (or embedded DRAM) cores. Each eDRAM core may be connected to an array of sixteen PEs, thus requiring 256 (16×16) PEs in all.

The programmable SRAM 24 functions as a program memory by storing commands issued by the TDU 18. For example, the TDU 18 may transmit a "write program memory address" command which sets up a start address for a write operation and a "write program memory data" command which writes a memory location and increments the program memory write address, among others. The programmable SRAM 24, in the current embodiment, has both an address register and a data output register.

The array control sequencer 26 is comprised of a simple 16 bit minimal instruction set computer (16-MISC). The array control sequencer 26 communicates with the TDU 18, the programmable SRAM 24, and the DCU 20, and is operable to generate register file addresses for the processing element array 28 and operable to sequence the array commands, among others.

The processing element array 28 is comprised of a multitude of processing elements ("PEs") 30 (see FIG. 2) connected in a variety of different arrangements depending on the design requirements for the processing system. For example, processing units may be arranged in hypercubes, butterfly networks, one-dimensional strings/loops, and two-dimensional meshes, among others. For discussion of the current embodiment, the PEs 30 are arranged in an 8×8, 2-dimensional loop connected array (see FIG. 7).

The processing element array 28 communicates with the DRAM module 22 and executes commands received from the programmable SRAM 24, the array control sequencer 26, the DCU 20, and the HMI 12. Each PE in the processing element array 28 includes dedicated H-registers for communication with the HMI 12. Control of the H-registers is shared by the HMI 12 and the DCU 20.

Figure 2:
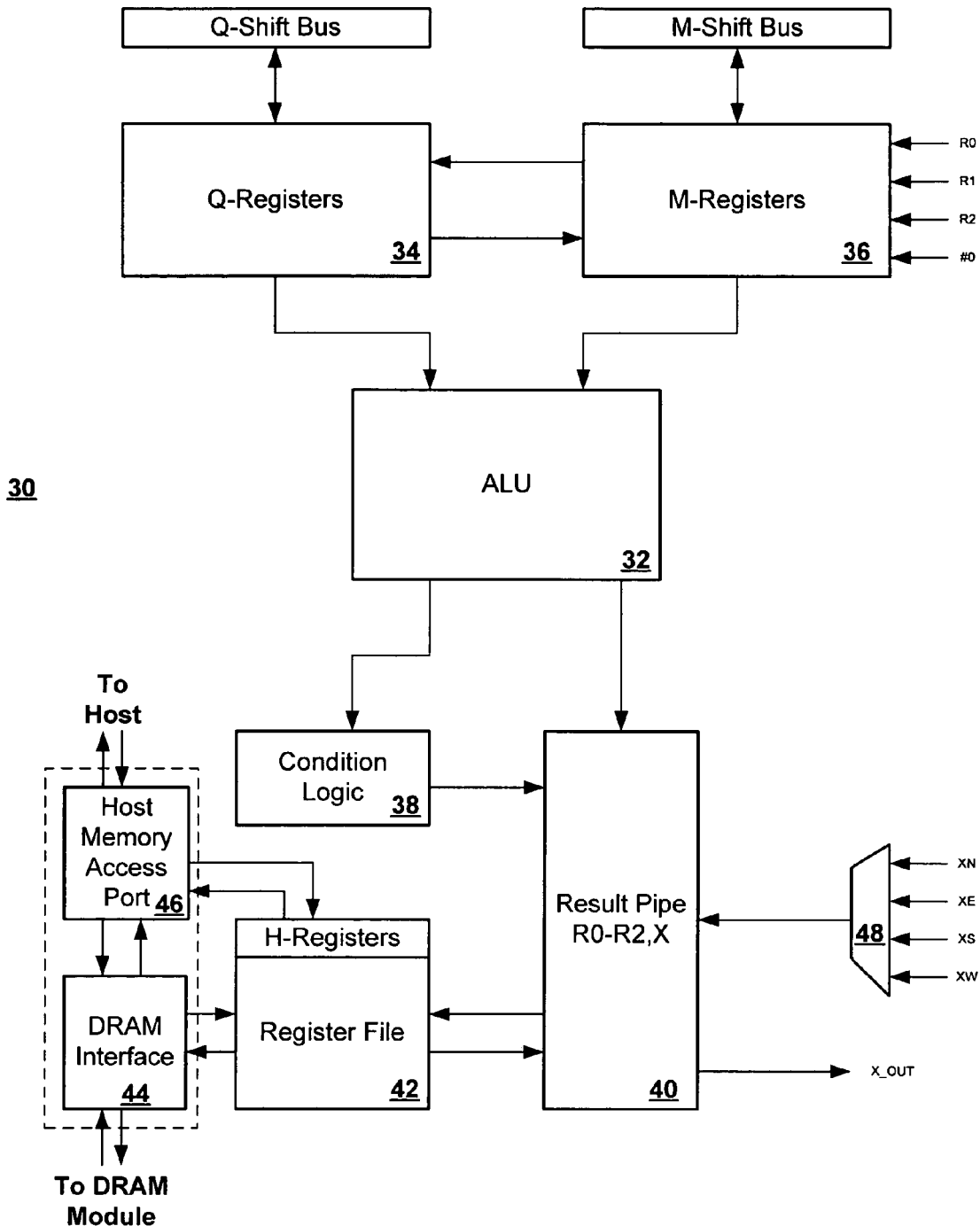
FIG. 2 is a block diagram of a processing element for the active memory illustrated in FIG. 1 according to an embodiment of the present invention.

Referring now to FIG. 2, a block diagram of a PE 30 according to one embodiment of the present invention is illustrated. PE 30 includes an arithmetic logic unit ("ALU") 32, Q-registers 34, M-registers 36, a shift control and condition register 38 (also called "condition logic" 38), a result register pipeline 40, and register file 42. The PE 30 may also contain other components such as multiplexers 48 and logic gates (not shown), among others.

In the current embodiment, the Q-registers 34 are operable to merge data into a floating point format and the M-Registers 36 are operable to de-merge data from a floating point format into a single magnitude plus an exponent format, among others. The Q- and M-registers may receive data from Q and M shift buses, respectively, and from the result register pipeline 40, among others.

The ALU 32 includes a multiplier-adder operable (among others) to receive information from the Q-registers 34 and M-registers 36, execute tasks assigned by the TDU 18 (see FIG. 1), and transmit results to the condition logic 38 and to the result register pipeline 40. The result register pipeline 40 is operable to communicate with the register file 42, which holds data for transfer into or out of the DRAM modules 22 via a DRAM interface 44. Data is transferred between the PE and the DRAM module 22 via a pair a registers, one register being responsive to the DCU 20 and the other register being responsive to the PE 30. The DRAM interface 44 receives command information from the DCU 20. The DRAM interface 44 also permits the PE 30 to communicate with the host through the host memory access port 46.

In the current embodiment, the H-registers 42 are comprised of synchronous SRAM and each processing element within the processing element array 28 contains eight H-registers 42 so that two pages can be stored from different DRAM locations, thus allowing the interleaving of short i/o bursts to be more efficient. Result register pipeline 40 also includes one or more neighborhood connection registers ("X-register") (see FIG. 3). The X-register links one PE 30 via a transfer network to its neighboring PE's 30 in the processing element array 28.

Figure 3:
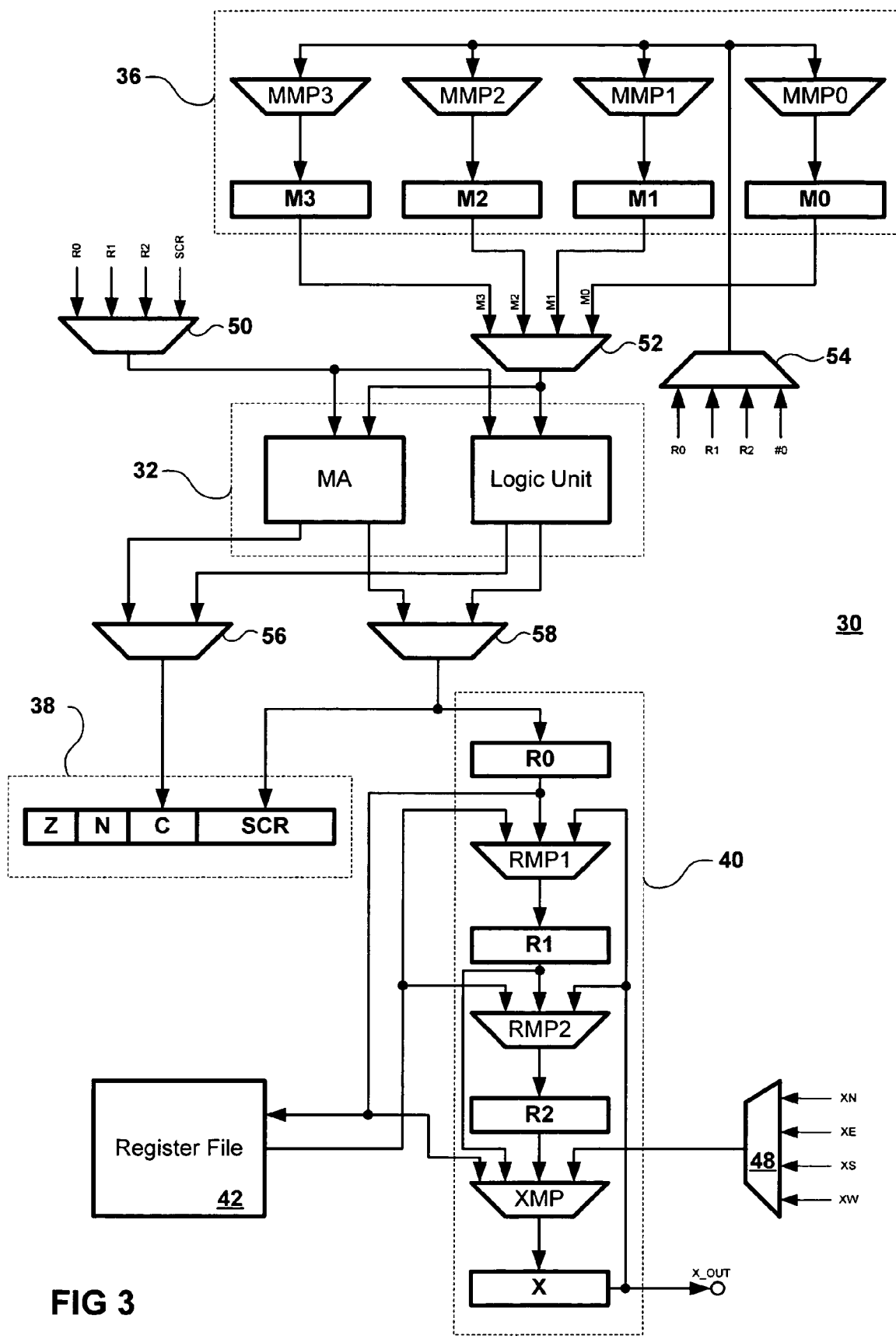
FIG. 3 is a more detailed illustration of the processing elements of FIG. 2 according to an embodiment of the present invention.

FIG. 3 is a more detailed illustration of some components of the processing element of FIG. 2 according to an embodiment of the present invention. For example in FIG. 3, M-registers 36 include of four (4) registers M0-M3 each having an associated multiplexer MMP0-MMP3, respectively, which receive signals from the result pipe 40 (among others) via multiplexer 54. The output of registers M0-M3 are connected to ALU 32 via multiplexer 52.

Additionally, result pipe 40 includes four (4) registers R0, R1, R2, and X, as well as several multiplexers (i.e., RMP1, RMP2, XMP). The output of registers R0, R1, and R2 may be sent, for example, to M-registers 36 via multiplexer 54 and to the ALU 32 via multiplexer 50. It should be noted that multiplexer 50 may also receive the output signals from Q-registers 34 (not shown), among others. Furthermore, the output of the X register may be sent back to registers R1 and R2 in the result pipe 40 and sent to neighboring PEs via a transfer network accessed through node X-OUT.

Figure 7:
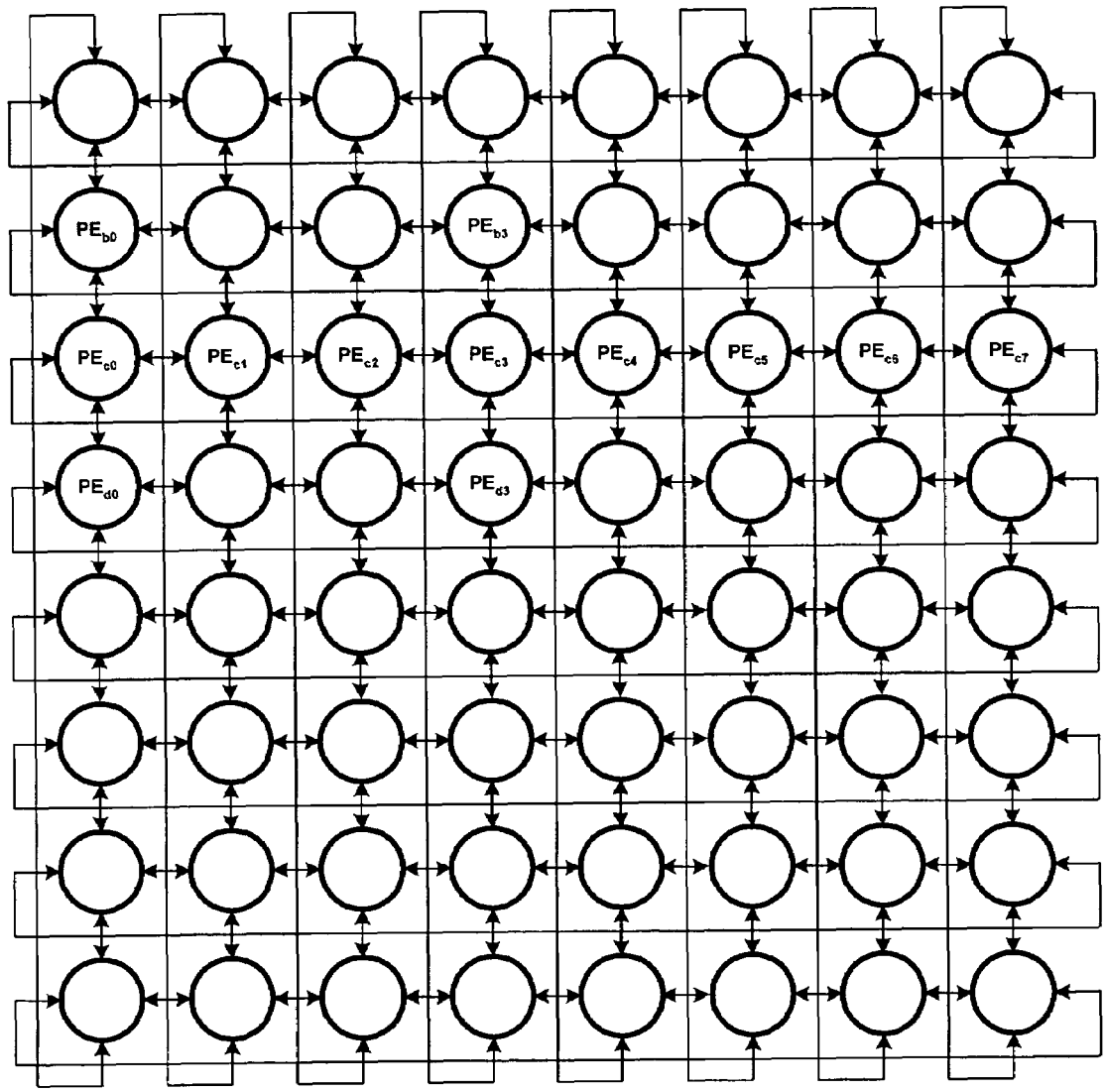
FIG. 7 illustrates processing elements of FIG. 2 arranged in a loop-connected two-dimensional array according to an embodiment of the present invention.

The transfer network refers to the interconnections which allow PEs to communicate with each other via their associated X registers. Referring briefly to FIG. 7 for example, the loop connected 8×8 2-D array 28 for the current embodiment is illustrated. A loop connected array refers to an array whose edge PEs (e.g., those in the first and last rows and the first and last columns) have a similar level of connectivity as non-edge arrays. FIG. 7 illustrates the connectivity of the rows and columns, respectively, of the array 28. More specifically in the loop connected 2-D array 28, the connections between edge PEs "wrap" around the column and rows, thus, both edge and non-edge PEs can transfer data to four neighboring PEs. For example in FIG. 7, $PE_{c3}$ is a non-edge PE which can communicate with its neighbors to the north (i.e., $PE_{b3}$), south (i.e., $PE_{d3}$), east (i.e., $PE_{c4}$), and west (i.e., $PE_{c2}$) and even though $PE_{c0}$ is an edge PE, $PE_{c0}$ can communicate with it neighbors to the north (i.e., $PE_{b0}$), south, (i.e., $PE_{d0}$), east (i.e., $PE_{c1}$), and west (i.e., $PE_{c7}$) due to the loop connection. It should be noted that loop connection for an n-dimensional array provides 2n neighbors for each PE (i.e., two neighbors in each dimension).

It should be noted that the number of PEs 30 included in array 28 may be altered while remaining within the scope of the present invention. Additionally, the number of dimensions for array 28 may be varied while remaining with the scope of the present invention. It should be further noted that each PE 30 is interconnected with its neighboring PEs via an associated X-register link. Accordingly, information can be shared among the PEs. It should be noted that the information may flow in any direction (i.e., north-to-south, south-to-north, east-to-west, and west-to-east) while remaining within the scope of the present invention.

Returning to FIG. 3, the X register is loaded through the X multiplexer (XMP) which selects one of the output of registers R0, R1, and R2 and the output of multiplexer 48, among others. It should be noted that multiplexer 48 receives signals XS, XE, XN, and XW from the transfer network. For example, XS represents the X_Out output from the instant PE's southern neighbor, XE represents the X_Out output from the instant PE's eastern neighbor, etc.

ALU 32 includes a 16-bit multiplier adder ("MA") and a logic unit, among others. In the current embodiment, the MA is designed to allow two's-compliment addition or subtraction and signed magnitude addition or subtraction. The logic unit is designed to allow logical functions between two arguments such as bit-wise OR and AND functions, among others. Condition logic 38 includes Z, N, and C flag registers, as well as an SCR register. As illustrated, the MA and the logic unit communicate with the C flag register via multiplexer 56 and with the SCR register and the result pipe 40 via multiplexer 58.

It should be noted that the detailed illustrated of PE 30 in FIG. 3 has a number of components, signal lines, and connections omitted for clarity. It should be apparent to those skilled in the art that additional components, signal lines, and connections may added while remaining within the scope of the present invention. For example, Q-Registers 34 (as shown in FIG. 2) including registers Q0-Q3 and associated multiplexers QMP0-QMP3, respectively, may be added while remaining within the scope of the present invention. The output of each register Q0-Q3 may be connected to multiplexer 50. Furthermore, it should become apparent to those skilled in the art that, with minor changes, the present invention may be implemented using the Q-registers 34 (among others) instead of M-registers 36 while remaining within the scope of the present invention.

The reader desiring more information about the hardware shown in FIGS. 1-3 is directed to UK Patent application 0221563.0 entitled "Control of Processing Elements in Parallel Processors" filed 17 Sep. 2002, which is hereby incorporated by reference. Details about the PEs may also be found in UK Patent Application No. 021562.2 entitled "Host Memory Interface for a Parallel Processor" filed 17 Sep. 2002, which is hereby incorporated by reference.

Figure 4:
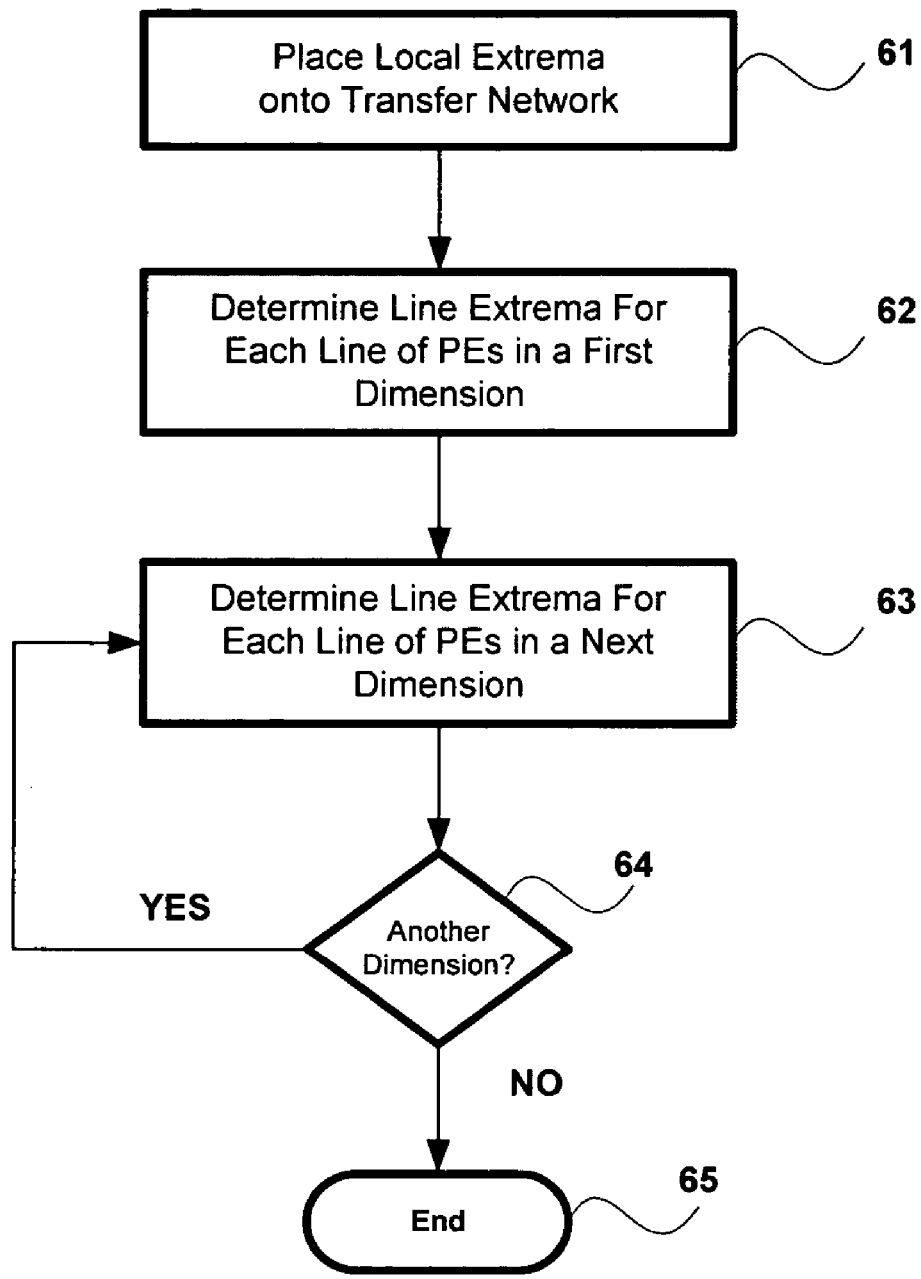
FIG. 4 illustrates an operational process for determining an extrema for an array of processing elements according to an embodiment of the present invention.

FIG. 4 illustrates an operational process 60 for determining an extrema for an array of processing elements according to an embodiment of the present invention. Operational process 60 begins when the local extrema for each PE is placed onto the transfer network in operation 61.

For example in the current embodiment, each PE in array 28 (see FIG. 7) receives a set of values from the DRAM interface 44 and the host memory access port 46 (see FIG. 1), among others. After the values are assigned to each PE in the array 28, each PE determines its local extrema. In the current embodiment, local extrema refers to the maximum or minimum value for a set of values assigned to an individual PE. A method for determining a local extrema from a set of values on an individual PE is discussed in more detail in U.S. patent application Ser. No. 10/689,335 entitled "Method for Finding Local Extrema of a Set of Values for a Parallel Processing Element" filed 20 Oct. 2003 and incorporated in its entirety by reference herein.

After each PE places its local extrema on the transfer network, an extrema is determined for each line in a first dimension of the array in operation 62. In the current embodiment, for example, each PE determines the row extrema for its associated row by comparing its local extrema to the local extrema of the other PEs within its row. Each PE transmits its local extrema via the transfer network to each other PE within the same row. Thus, each PE within the same row will calculate the same row extrema as the other PEs within that row.

For example referring to FIG. 7, assume that the local extremas for the PEs in row-c (i.e., the third row) are determined as follows: $PE_{c0}=2$, $PE_{c1}=5$, $PE_{c2}=1$, $PE_{c3}=6$, $PE_{c4}=3$, $PE_{c5}=2$, $PE_{c6}=4$, $PE_{c7}=5$. Accordingly, the local extremas for row-c may be represented by the set of values {2, 5, 1, 6, 3, 2, 4, 5}. Each PE within row-c (i.e., $PE_{c0}$-$PE_{c7}$) receives via the transfer network, and determines the row extrema from, this set of values.

It should be noted, however, that each PE will receive the set of values in a different order. Referring to FIG. 7, consider the embodiment where the data is moved from right to left. For example, $PE_{c2}$ will see it own value (i.e., 1), followed by values moving in from the right hand side so the order of the set of values for $PE_{c2}$ will be {1, 6, 3, 2, 4, 5, 2, 5}. $PE_{c3}$ will receive the same set of values, however, $PE_{c3}$ will see it own value (i.e., 6), followed by values moving in from the right hand side. Thus, the order of the set of values for $PE_{c3}$ will be {6, 3, 2, 4, 5, 2, 5, 1}. The specific order of the set of values for the remaining PEs may be found in a similar manner.

The position of each value within the value set may be designated as {1, 2, 3, 4, . . . N} and thus, depending on its position within the set, a value may be designated as either "odd numbered" or "even numbered." For example, an "odd numbered value" refers to those values located at an odd numbered position within the value set. The odd numbered values for $PE_{c2}$ in the current embodiment, for example, are values 1, 3, 4, and 2 which located at odd numbered positions 1, 3, 5, and 7, respectively in $PE_{c2}$'s data set. The odd numbered values for $PE_{c3}$ in the current embodiment, however, are values 6, 2, 5, and 5 which are located at the odd numbered positions 1, 3, 5, and 7, respectively, in $PE_{c3}$'s data set. Similarly, an "even numbered value" refers to those values located at an even numbered position within the value set. The even numbered values for $PE_{c2}$ in the current embodiment, for example, are values 6, 2, 5, and 5 which are located at even numbered positions 2, 4, 6, and 8, respectively, in $PE_{c2}$'s data set. The even numbered values for $PE_{c3}$ in the current embodiment, however, are values 3, 4, 2, and 1 which are located at the even numbered positions 2, 4, 6, and 8, respectively, in $PE_{c3}$'s data set.

It should be noted that in the current embodiment, each local extrema in the set is represented by 8-bits (i.e., 1-byte) of information within the PE and the values, as seen by each PE, are in binary format. However for simplicity, the values are represented in decimal format in the instant discussion. Accordingly, the set may be represented as {byte-1, byte-2, byte-3, . . . byte-8}, where the numerals 1-8 represent each byte's location within the set, thus byte-1=2, byte-2=5, byte-3=1, etc.

In operation 62, each PE in the row receives this set of values from the transfer network and simultaneously determines the row extrema from this set. For simplicity, the current discussion will be limited to finding the high row extrema for the array 28, however, it should be noted that a low row extrema may be determined while remaining within the scope of the present invention. In the current embodiment, each PE in row-c determines that the high row extrema for row-c is equal to 6 in operation 62. It should be noted that the PEs in the other rows of array 28 simultaneously determine the row extrema for their associated row.

After a line extrema is found for each line for a first dimension in the array, a line extrema is found for each line for a next dimension in the array in operation 63. For example in the current embodiment, each PE determines the column extrema for its associated column by comparing its row extrema to the row extrema of the other PEs within its column. Each PE transmits its row extrema via the transfer network to each other PE within the same column. Thus, each PE within the same column will calculate same column extrema as the other PEs within that column.

Again referring to FIG. 7, assume that the row extremas for the array 28 are determined in operation 62 as follows: row-a=7, row-b=3, row-c=6, row-d=4, row-e=5, row-f=4, row-g=2, row-h=3. Accordingly, the row extrema for the array 28 may be represented by the set of values {7, 3, 6, 4, 5, 4, 2, 3}. In operation 63, each PE in the column receives the set of row extrema values via the transfer network and determines the column extrema from this set. In the instant example, each PE determines that the high column extrema is equal to 7. It should be noted that the low column extrema (here equal to 2) may also be determined while remaining within the scope of the present invention. It should further be noted that the value of the column extrema in the instant example also represents the value of the array extrema (i.e., each PE will have as its column extrema the local extrema value from PE having the largest local extrema (i.e., high array extrema) or smallest local extrema (i.e., low array extrema)).

Operational process 60 then continues with determination process 64. If the array has another dimension, control branches YES and operation 63 is repeated for the next dimension. If the array does not have another dimension, control branches NO and operation 65 terminates operational process 60.

It should be apparent to one skilled in the art that in an alternative embodiment the order of operations 62 and 63 may be reversed while remaining within the scope of the present invention. For example, the column extrema may be found first. The set of column extrema are then used to determine the row extrema. In the instance in which order of operations 62 and 63 are reversed, the value determined for the row extrema also represents the value of the array extrema.

It should further be noted that the present invention may be employed for arrays of other sizes and shapes. For example, the present invention may be used to balance an K×L×M× . . . etc., n-dimensional array of processing elements (PEs), wherein K represents the number of PEs on a line traversing a first dimension of the array, L represents the number of PEs on a line traversing a second dimension of the array, M represents the number of PEs on a line traversing a third dimension of the array, etc. More generally, the present invention may be used to balance and an array having (N) PE's traversing each line in a dimension, where N may be different for each dimension.

One example may be a 3×5×7 array in which the array is comprised of three (3) lines in a first dimension, five (5) lines in a second dimension, and seven (7) lines in a third dimension. Applying operational process 60 to the 3×5×7 array, each PE calculates the extrema for its row (i.e., the first dimension) using the local extrema of the other PEs in the associated row. Next, each PE calculates the extrema for its column (i.e., the second dimension) using the row extrema of the other PEs in the associate column. Then, each PE calculates the extrema for its line in the third dimension using the column extrema of the other PEs in its third dimensional line.

Figure 5:
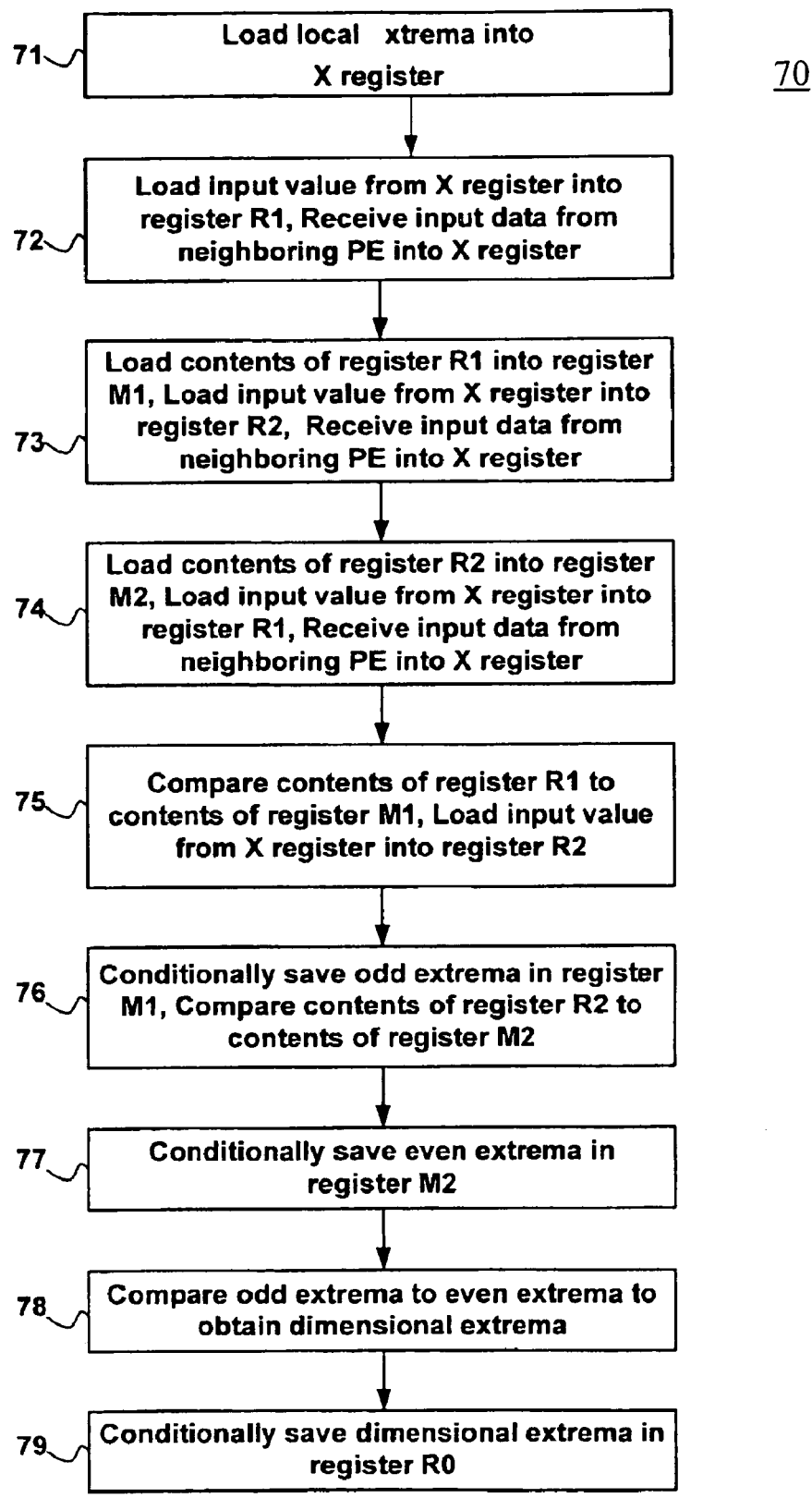
FIG. 5 is an operational process for determining an extrema of a single dimension of an n-dimensional array of processing elements according to an embodiment of the present invention.

FIG. 5 illustrates an operational process 70 for determining an extrema of a single dimension within an N-dimensional array of processing elements according to an embodiment of the present invention. For example, operational process 70 may be used by a processing element to determine the row (column) extrema for an associated row (column) as discussed in conjunction with operation 62 (63) of operational process 60. For simplicity, the discussion of operational process 70 will be limited to its application to the first processor within row-c of array 28 (i.e., processor $PE_{c0}$).

In operational process 70, as the input values are received by the PE, they are alternatingly placed into odd and even pipelines. Each pipeline is made up of one or more registers (among others). Once separated into the odd and even pipelines, an odd extrema and an even extrema are found. The odd and even extrema are then compared to each other and a dimensional (e.g., row, column, line, etc.) extrema is found.

After reading the following discussion, it should become apparent to those skilled in the art that operational process 70 may be implemented simultaneously by each processor in the array 28, and that operational process 70 may be applied to other sizes of arrays and other types of arrays (e.g., non-square N-dimensional arrays) while remaining within the scope of the present invention.

Operational process 70 begins when the PE loads its local extrema onto the transfer network in operation 71. As discussed above in conjunction with FIG. 3, the transfer network refers to the interconnections which allow PEs to communicate with each other via their associated X registers. In the current embodiment, the local extrema is determined, for example, as discussed above in conjunction operation 62 of FIG. 4. In the instant embodiment, the PEs of row-c in array 28 have local extrema represented by the set of values {2, 5, 1, 6, 3, 2, 4, 5}. Accordingly, byte-1 (i.e., 2) represents the local extrema for $PE_{c0}$. Thus, in operation 71, $PE_{c0}$ loads the value 2 into its X register.

After the PE loads its local extrema onto the transfer network, the following three actions occur simultaneously in operation 72: the value within the X register is loaded into a first register, the value of the X register is placed on the transfer network and shifted one PE around a loop (e.g. row) of the transfer network. This has the effect that the X register receives the next local extrema from a PE adjacent on the loop of the transfer network.

For example in the current embodiment, byte-1 is loaded from the X register into register R1 via RMP1, byte-1 is shifted westward (i.e., towards $PE_{c7}$) X_Out on the transfer network; and byte-2 is loaded into the X register via multiplexer 48 and XMP. It should be noted that byte-2 is the local extrema from $PE_{c0}$'s closest eastern neighbor (i.e., $PE_{c1}$). It should be noted that in the current embodiment, registers R1 and M1 comprise (among others) a portion of $PE_{c0}$'s odd pipeline.

After operation 72 is complete, the following actions occur simultaneously in operation 73: the value in the first register is transferred to a third register, the value within register X is loaded into a second register, and the X register retrieves the next local extrema from the transfer network. It should be noted that the third register is used to store the odd extrema within the PE, it is initialized with the first odd value received (e.g., byte-1).

In the current embodiment, byte-1 is transferred from register R1 to register M1 via multiplexer 54 and multiplexer MMP1, byte-2 is loaded from the X register to register R2 via the multiplexer RMP2, and byte-3 (i.e., the local extrema of $PE_{c2}$) is loaded into the X register via multiplexer 48 and XMP. It should be noted that in the current embodiment, registers R2 and M2 comprise (among others) a portion of $PE_{c0}$'s even pipeline. It should further be noted that register M1 is used to store the odd extrema, it is initialized with the value of byte-1 (i.e., 2).

In operation 74 the following actions simultaneously occur, the value in register X is loaded into the first register, the value in the second register is loaded into a fourth register, and the X register retrieves the next local extrema from the transfer network. It should be noted that the fourth register is used to store the even extrema within the PE, it is initialized with the first even value received (e.g., byte-2).

Accordingly in the current embodiment, byte-3 is loaded into register R1 via the multiplexer RMP1, byte-2 is transferred from register R2 into register M2 via the multiplexer 54 and multiplexer MMP2, and byte-4 (i.e., the local extrema of $PE_{c3}$) is loaded into the X register via multiplexer 48 and XMP. It should be noted that register M2 is used to store the even extrema, it is initialized with the value of byte-2 (i.e., 5).

In operation 75, the content of the first register is compared to the content of the third register to obtain the odd extrema and the value in the X register is loaded into the second register R2. (It should be noted that the next input value will also be retrieved by the X-register from the transfer network, however for simplicity, discussion of the remaining input values will be omitted.)

In the current embodiment, the content of the first register and the third register are loaded into the ALU's 32 Multiplier/Adder (MA) and Logic Unit and one value is subtracted from the other. For example, the MA subtracts the value contained in the third register from the value contained in the first register. If the result is negative (i.e., if the value within third register is greater than the value within the first register), then flag C in the control logic 38 is set to zero (0). If the result is positive or zero (i.e., the value within the first register is greater than or equal to the value within the third register), then flag C in the control logic 38 is set to one (1).

For example in operation 75 of the instant case, byte-3 (which is contained in the first register, R1) and byte-1 (which is contained within the third register, M1) are loaded into the MA, while byte-4 is loaded into R2 (i.e., the second register) via the multiplexer RMP2. (Again, it should be noted that the discussion of byte-5, which will be loaded from the transfer network into the X register, has been omitted for clarity.) The value within M1 (i.e., byte-1) is subtracted from the value within R1 (i.e., byte-3) resulting in a negative value (i.e., R1−M1=byte-3−byte-1=1−2=−1). Accordingly, flag C is set to zero (0). It should be apparent to those skilled in the art that other types of comparisons may be used while remaining within the scope of the present invention, for example, subtracting byte-3 from byte-1.

In operation 76, the value of the odd extrema is conditionally updated within the third register. In the current embodiment, the value of flag C determined in operation 75 is used to conditionally update the odd extrema in the third register. For example if the largest value on the PE is to be found (i.e., the high extrema), then the value in the first register will be loaded into the third register when flag C is equal to one (1), whereas the value within the third register will remain in the third register when flag C is equal to zero (0). In this case, the third register may be referred to as the "odd max register" because the largest value in the odd pipeline that has thus far been found by the process is stored in the third register. For example in the current embodiment where the high extrema of the set of values within the PE is being determined, byte-1 (which is greater than the value of byte-3) remains within register M1 because flag C was set equal to zero (0) in operation 75.

On the contrary if the smallest value on the PE is to be found (i.e., the low extrema), then the value within the first register will be loaded into the third register when flag C is equal to zero (0), whereas the value within the third register will remain within the third register when flag C is equal to one (1). In this case, the third register may be referred to as the "odd min register" because the smallest value in the odd pipeline that has thus far been found by the process is stored in the third register.

Additionally in operation 76, the value in the second register is compared to the value within the fourth register to obtain an even extrema. The values in the second register and the fourth register are loaded into the ALU's 32 Multiplier/Adder (MA) and Logic Unit and one value is subtracted from the other. For example, the MA subtracts the value contained in the fourth register from the value contained in the second register. If the result is negative (i.e., if the value within fourth register is greater than the value within the second register), then flag C in the control logic 38 is set to zero (0). If the result is positive or zero (i.e., the value within the register is greater than or equal to the value within the fourth register), then flag C in the control logic 38 is set to one (1).

For example in operation 76 of the instant case, byte-4 (which is contained in the second register, R2) and byte-2 (which is contained within the fourth register, M2) are loaded into the MA. The value within M2 (i.e., byte-2) is subtracted from the value within R2 (i.e., byte-4) resulting in a positive value (i.e., R2−M2=byte-4−byte-2=6−5=1). Accordingly, flag C is set to one (1). It should be apparent to those skilled in the art that other types of comparisons may be used while remaining within the scope of the present invention, for example, subtracting byte-4 from byte-2.

In operation 77, the value of the even extrema is conditionally updated within the fourth register. In the current embodiment, the value of flag C determined in operation 76 is used to conditionally update the even extrema in the fourth register. For example if the largest value on the PE is to be found (i.e., the high extrema), then the value in the second register will be loaded into the fourth register when flag C is equal to one (1), whereas the value within the fourth register will remain in the fourth register when flag C is equal to zero (0). In this case, the fourth register may be referred to as the "even max register" because the largest value in the even pipeline that has thus far been found by the process is stored in the fourth register. For example in the current embodiment where the high extrema of the set of values within the PE is being determined, byte-4 (which is greater than the value of byte-2) is loaded from the R2 register into the M2 register because flag C was set equal to one (1) in operation 75.

On the contrary if the smallest value on the PE is to be found (i.e., the low extrema), then the value within the second register will be loaded into the fourth register when flag C is equal to zero (0), whereas the value within the fourth register will remain within the fourth register when flag C is equal to one (1). In this case, the fourth register may be referred to as the "even min register" because the smallest value in the even pipeline that has thus far been found by the process is stored in the fourth register.

It should be apparent to one skilled in the art that the above described steps are repeated until all of the odd numbered values in the set have been compared to each other and all of the even numbered values in the set have been compared to each other. The odd and even extremas for the set are then contained in the third and fourth registers, respectively. After all of the values in the set have been processed and the odd extrema and the even extrema have been found, operation 78 is implemented.

In operation 78, the dimensional extrema is found by comparing the odd extrema to the even extrema. In the current embodiment, the odd extrema and the even extrema are loaded into the ALU-MA and one value is subtracted from the other. For example, the MA subtracts the even extrema from the odd extrema. If the result is negative (i.e., the even extrema is greater than the odd extrema), then flag C in the control logic 48 is set to zero (0). If the result is positive or zero (i.e., the odd extrema is greater than or equal to the even extrema), then flag C in the control logic 48 is set to one (1).

In the current embodiment, the odd extrema in M1 is first loaded into register R0. The even extrema in M2 is then subtracted from odd extrema in R0. The flag C is generated. For the set of values given in the current embodiment for example, the odd extrema is equal to four (4) (i.e., byte-7=4) and the final even extrema is equal to six (6) (i.e., byte-4=6). Thus, the odd extrema is loaded into R0 and the even extrema (i.e., byte-4) is subtracted from the odd extrema (i.e., byte-7) yielding a negative result (i.e., 4–6=–2). Accordingly, flag C is set to zero (0).

It should be apparent to those skilled in the art that other types of comparisons may be used while remaining within the scope of the present invention, for example, subtracting the value of the odd extrema from the value of the even odd extrema.

In operation 79, the value of the dimensional extrema (here the row extrema) found in operation 78 is conditionally updated within the fourth register. The value of flag C, as discussed in conjunction with operation 78, is used to conditionally update the dimensional extrema in the fourth register. For example if the largest value on the dimension is to be found (i.e., the high extrema), then the odd extrema will be loaded into the fourth register if flag C is equal to one (1), whereas the even extrema will remain within the fourth register if flag C is equal to zero (0). On the contrary if the smallest value on the dimension is to be found (i.e., the low extrema), then the odd extrema will be loaded into the fourth register if flag C is equal to zero (0), whereas the even extrema will be loaded into the fourth register if flag C is equal to one (1).

In the current embodiment where the high extrema of the set of values within the row is being determined, the value of the even extrema (i.e., 6) remains within register M2 because flag C was set equal to zero (0) in operation 78. It should be noted that the row extrema may be returned from register M2 to the register file 42 or sent the X register (among others), for example for use in a subsequent process such as determining the column extrema for the array. It should further be noted that other registers may be used while remaining within the scope of the present invention.

Also as previously mentioned, the discussion of operational process 70 was limited to finding the dimensional extrema for an 8×8 array, however, operational process 70 may be scaled for any number of PEs within a dimension.

Figure 6:
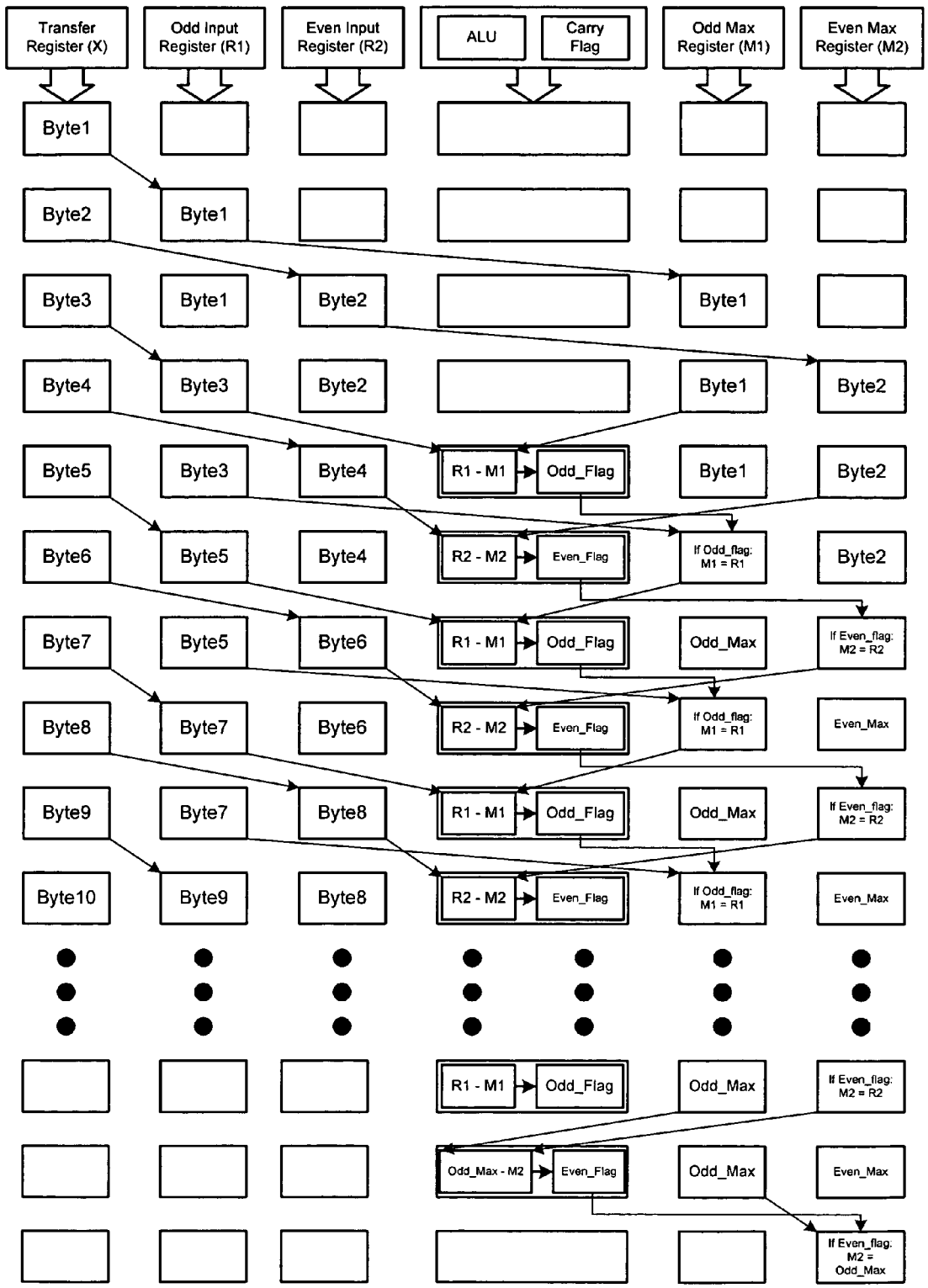
FIG. 6 is a graphical representation of the results of the operational process illustrated in FIG. 5 according to an embodiment of the present invention.

Referring to FIG. 6, it should be noted that each row of the first several rows represent the results obtained using operational process 70 after one cycle, or clock pulse. The first row, for example, represents the results obtained after operation 71 is completed wherein the value of the first odd byte (i.e., byte-1) is loaded into the X register. Similarly, the second row represents the results of operation 72 wherein the value of byte-1 is loaded into register R1 and the value for the even byte (i.e., byte-2) is retrieved from the transfer network and loaded into the X register. Similarly, the third and fourth rows represent the results of operations 73 and 74, respectively.

Referring to the fifth row, in addition to the results discussed above in conjunction with operation 75, the address of the next odd byte in the set (i.e., byte-5) is retrieved from the X register for the 8×8 array in the current embodiment and the value of byte-4 is loaded into register R2. Likewise referring to the sixth row, in addition to the results discussed above in conjunction with operation 76, and the address for the next even byte of the set (i.e., byte-6) is retrieved from the X register. Values for each odd and even numbered byte will be alternately fed through the PE. As operational process 70 continues, the value of each subsequent odd numbered byte is compared to the value of the odd extrema that is saved in register M1 and any updated odd extrema is saved back into M1. Additionally, the value of each subsequent even numbered byte is compared to the even extrema that is saved in register M2 and any updated even extrema is saved back into M2. The odd extrema and even extrema are not compared to each other (i.e., as in operation 78) until the extrema for all of the odd bytes in the set and the extrema for all of the even bytes in the set have been finally determined. Thus, operational process 70 can be scaled for any PEs within a dimension.

It should be recognized that the above-described embodiments of the invention are intended to be illustrative only. Numerous alternative embodiments may be devised by those skilled in the art without departing from the scope of the following claims.

What is claimed is:

1. A method of optimizing the operation of an n-dimensional array of processing elements comprising:
   determining a local extrema for each of said processing elements;
   serially outputting, on each clock cycle, said local extrema from each of said processing elements to a neighboring processing element until every processing element in a first dimension has received all local extrema along said first dimension;
   determining within each of said processing elements a first dimensional extrema for said first dimension of said n-dimensional array, wherein said dimensional extrema is determined concurrently with the receipt of said local extrema from said processing elements in said first dimension;
   serially outputting, on each clock cycle, said first dimensional extrema from each of said processing elements to a neighboring processing element until every processing element in a next dimension has received all first dimensional extrema along said next dimension;
   determining within each of said processing elements a next dimensional extrema for a next dimension of said n-dimensional array, wherein said next dimensional extrema is determined concurrently with the receipt of said first dimensional extrema;
   repeating said serially outputting on each clock cycle and concurrently determining within each of said processing elements a next dimensional extrema for each of said n-dimensions, wherein each of said next dimensional extrema is determined from a dimensional extrema from a previously selected dimension, until the global extrema is determined; and
   saving said global extrema.

2. The method of claim 1 wherein said determining a local extrema comprises:
   separating a set of input values within said processing element into an odd set corresponding to values in odd positions within said set of input values and an even set corresponding to values in even positions within said set of input values, and saving each of said odd set and said even set in first and second registers, respectively;

determining a first extrema from said odd set, and saving said first extrema in a third register;

determining a second extrema from said even set, and saving said second extrema in a fourth register; and determining said local extrema from said values in said third and fourth registers.

3. The method of claim 1 wherein said determining within each of said processing elements a dimensional extrema for a first dimension of said n-dimensional array comprises:

serially receiving a set of local extrema from said processing elements within said first dimension;

separating said set of local extrema into an odd set corresponding to values in odd positions within said set of local extrema and an even set corresponding to values in even positions within said set of local extrema, and saving each of said odd set and said even set in first and second registers, respectively;

determining a first extrema from said odd set, and saving said first extrema in a third register;

determining a second extrema from said even set, and saving said second extrema in a fourth register; and determining said dimensional extrema for a first dimension from said values in said third and fourth registers.

4. The method of claim 3 wherein determining within each of said processing elements a dimensional extrema for a first dimension of said n-dimensional array comprises:

loading a value from an odd position within said set into said first register;

loading a value from an even position within said set into said second register and transferring said value within said first register to said third register;

loading a value from a next odd position within said set into said first register and transferring said value within said second register to said fourth register; and loading a value from a next even position within said set into said second register.

5. The method of claim 4 wherein said determining a first extrema from said odd set comprises comparing the value in said first register to the value in said third register.

6. The method of claim 5 further comprising:

selecting the greater value from said first register and said third register if a high first extrema is desired; and selecting the lesser value from said first register and said third register if a low first extrema is desired.

7. The method of claim 5 further comprising:

updating said first extrema in said third register;

loading another value from an odd position within said set into said first register;

comparing the value in said first register to the value in said third register; and repeating said updating, loading and comparing steps for remaining values within an odd position within said set.

8. The method of claim 4 wherein said determining a second extrema from said even set of values comprises comparing the value in said second register to the value in said fourth register.

9. The method of claim 8 further comprising:

selecting the greater value from said second register and said fourth register if a high second extrema is desired; and selecting the lesser value from said second register and said fourth register if a low second extrema is desired.

10. The method of claim 8 further comprising:

updating said second extrema in said fourth register;

loading another value from an even position within said set into said second register;

comparing the value in said second register to the value in said fourth register; and repeating said updating, loading and comparing steps for remaining values within an even position within said set.

11. The method of claim 1 wherein said determining within each of said processing elements a next dimensional extrema for a next dimension of said n-dimensional array comprises:

serially receiving a set of said dimensional extrema for a first dimension from said processing elements within said next dimension;

separating said set of dimensional extrema for a first dimension into an odd set corresponding to values in odd positions within said set of dimensional extrema and an even set corresponding to values in even positions within said set of dimensional extrema, and saving each of said odd set and said even set in first and second registers, respectively;

determining a first extrema from said odd set, and saving said first extrema in a third register;

determining a second extrema from said even set, and saving said second extrema in a fourth register; and determining said next dimensional extrema for a next dimension from said values in said third and fourth registers.

12. The method of claim 1 wherein said repeating said determining within each of said processing elements a next dimensional extrema for each of n-said dimensions comprises:

serially receiving a set of dimensional extrema from said processing elements within a previously selected dimension;

separating said set of dimensional extrema from said previously selected dimension into an odd set corresponding to values in odd positions within said set of dimensional extrema and an even set corresponding to values in even positions within said set of dimensional extrema, and saving each of said odd set and said even set in first and second registers, respectively;

determining a first extrema from said odd set, and saving said first extrema in a third register;

determining a second extrema from said even set, and saving said second extrema in a fourth register; and determining said next dimensional extrema for said next dimension from said values in said third and fourth registers.

13. An n-dimensional array of processing elements, comprising:

a plurality of processing elements interconnected to form an n-dimensional array, each processing element comprising:

an arithmetic logic unit;

condition logic responsive to said arithmetic logic unit;

a plurality of registers connected to a bus and responsive to said arithmetic logic unit;

a result pipeline responsive to said arithmetic logic unit;

an interface; and register files connected between said interface and said result pipeline; said processing elements configured to:

determine a local extrema;

serially output, on each clock cycle, said local extrema to a neighboring processing element until every processing element in a first dimension has received all local extrema along said first dimension;

determine a first dimensional extrema for said first dimension of said n-dimensional array, wherein said dimensional extrema is determined concurrently with the receipt of said local extrema from said processing elements in said first dimension;

serially output, on each clock cycle, said first dimensional extrema to a neighboring processing element until every processing element in a next dimension has received all first dimensional extrema along said next dimension;

determine a next dimensional extrema for a next dimension of said n-dimensional array, wherein said next dimensional extrema is determined concurrently with the receipt of said first dimensional extrema;

repeat said serially outputting on each clock cycle and concurrently determining for each of said n-dimensions, wherein each of a next dimensional extrema is determined from a dimensional extrema from a previously selected dimension, until a global extrema is determined; and save said global extrema.

14. The array of processing elements of claim 13 wherein said processing elements are configured to:

separate a set of serially received input values into an odd set corresponding to values in odd positions within said set of input values and an even set corresponding to values in even positions within said set of input values, and saving each of said odd set and said even set in first and second registers, respectively;

determine a first extrema from said odd set, and saving said first extrema in a third register;

determine a second extrema from said even set, and saving said second extrema in a fourth register; and determine an extrema from said values in said third and fourth registers.

15. The array of processing elements of claim 14 wherein said processing elements are configured to:

select the greater value from said first register and said third register if a high first extrema is desired; and select the lesser value from said first register and said third register if a low first extrema is desired.

16. The array of processing elements of claim 14 wherein said processing elements are configured to:

select the greater value from said second register and said fourth register if a high second extrema is desired; and select the lesser value from said second register and said fourth register if a low second extrema is desired.

17. The array of processing elements of claim 14 wherein said processing elements are configured to:

select the greater value from said third and fourth registers if a local high extrema is desired; and select the lesser value from said third and fourth registers if a local low extrema is desired.

18. The array of processing elements of claim 15 wherein the processing elements are configured to:

serially load another value from an odd position within said set into said first register;

compare the value in said first register to the value in said third register; and repeat said storing, loading and comparing steps for remaining values within odd positions within said set.

19. The array of processing elements of claim 16 wherein said processing elements are configured to:

serially load another value from an even position within said set into said second register;

comparing the value in said second register to the value in said fourth register; and repeat said storing, loading and comparing steps for remaining values within even positions within said set.

* * * * *